Nov. 11, 1941.  E. M. MEACHAM  2,262,692
COOKING APPLIANCE
Filed April 25, 1939    3 Sheets—Sheet 2

INVENTOR
E. M. Meacham
By
Pattison, Wright & Pattison
ATTORNEYS

Nov. 11, 1941.  E. M. MEACHAM  2,262,692
COOKING APPLIANCE
Filed April 25, 1939   3 Sheets-Sheet 3
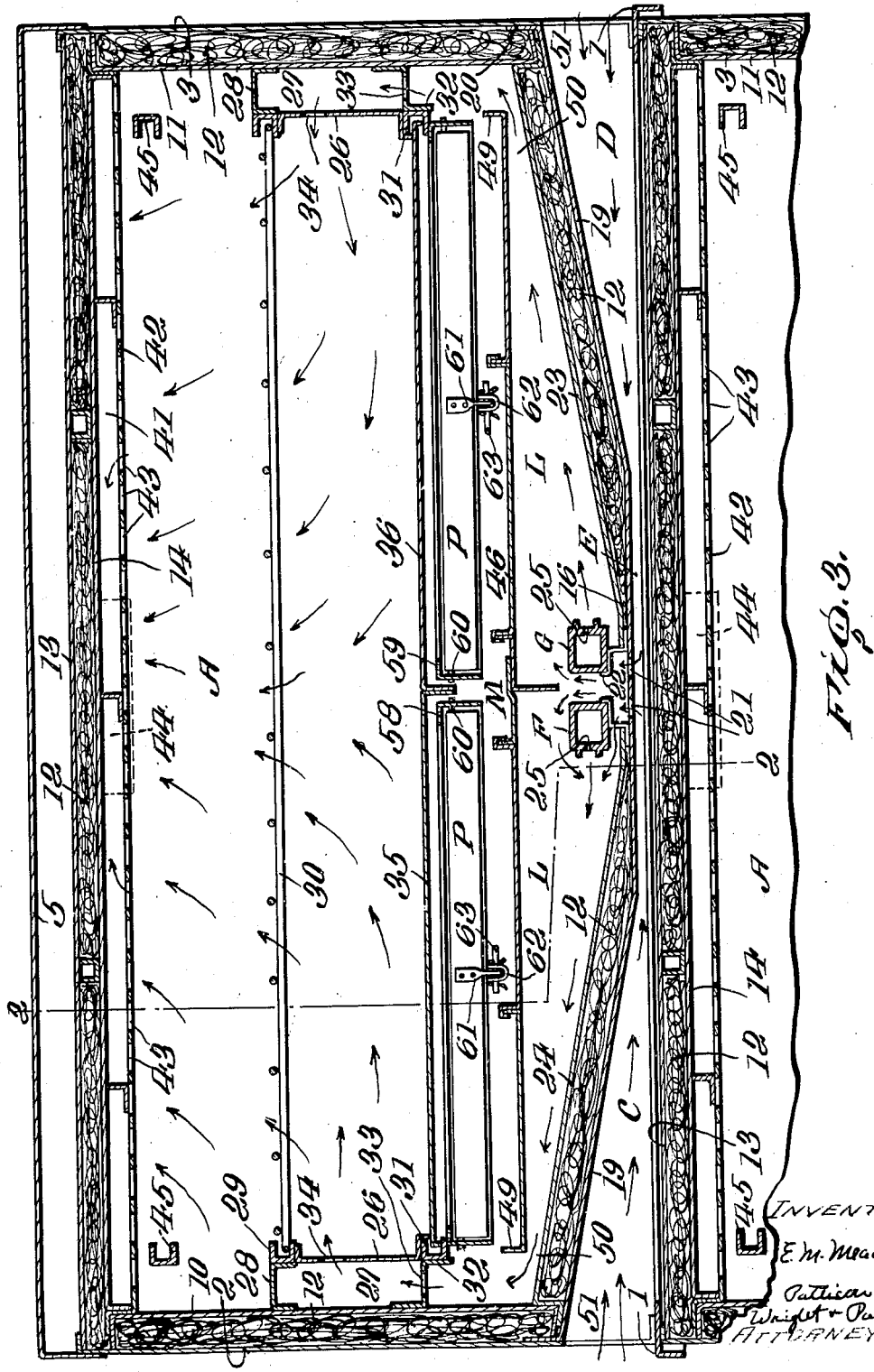

Patented Nov. 11, 1941

2,262,692

UNITED STATES PATENT OFFICE 2,262,692

COOKING APPLIANCE

Edward M. Meacham, Cleveland, Ohio, assignor to American Stove Company, St. Louis, Mo., a corporation of New Jersey Application April 25, 1939, Serial No. 269,989

14 Claims. (Cl. 126—39)

The present invention pertains to a gas heated roasting and baking oven having a novel and improved bottom heat control for the roasting or baking chamber, and particularly to a device of this character in which there is provided an automatic and thermostatically operated heat control for obtaining and maintaining any predetermined general temperature within the baking or roasting compartments.

As a consequence the primary object of the invention is the provision of a novel and improved bottom heat control for a gas heated oven or chamber.

Another object of the invention is the provision of a bottom heat control for a device of the character stated in which change in bottom or top temperature within the oven or heating compartments can be obtained rapidly.

A still further object of the invention is the provision of a novel and improved bottom heat control mechanism and arrangement for an oven or cooking chamber which in itself is provided with a thermostatic temperature control, which bottom heat control will change the ratio of top and bottom heat irrespective of the setting of the thermostatic temperature control.

Another object of the invention is the provision of simple, cheap and durable means for controlling the top and bottom temperatures of an oven or cooking chamber in combination with which is provided visual means for determining the ratio of bottom and top heat within said chamber.

Another and still further object of the invention is that of providing an insulating means of novel and improved construction for a cooking chamber which insulating means is not only original as to its construction and mode of operation but is also novel in respect to the particular material of which it is constructed and the principle upon which it operates.

Numerous other objects, novel features of construction and improved results of the invention will appear in more detail from the following detailed description of the invention when read in the light of the accompanying drawings which illustrate a preferred embodiment of the invention.

In the drawings:

Fig. 3 is a vertical sectional view taken at approximately right angles to Fig. 2 of the drawings.

Fig. 4 is a fragmentary top plan view of the oven hearth or bottom.

Fig. 5 is a vertical sectional view taken on the line 5—5 of Fig. 4.

Fig. 6 is a strung-out perspective view illustrating a portion of the louvre operating mechanism.

Fig. 7 is a sectional view through the handle carrying block of the louvre operating mechanism.

Figure 1:
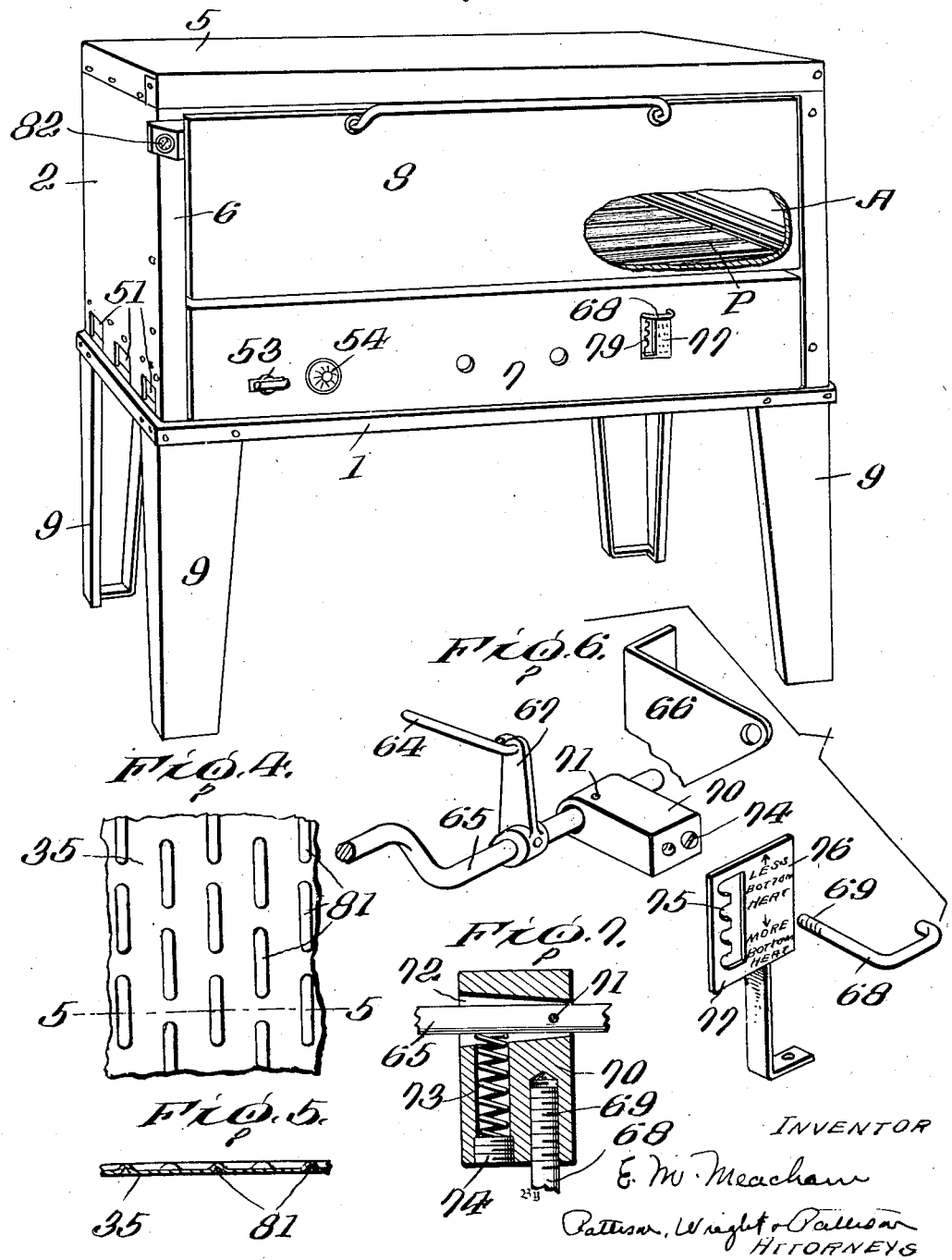
Fig. 1 is a view in front elevation of the invention, a portion of the figure being broken away to more clearly illustrate the construction.

The attached drawings illustrate the invention as being embodied in what I term a portable roasting or baking oven unit, which unit is so constructed as to combine with other similar units that they may be stacked or placed one upon the other to provide a plurality of cooking chambers in superposed relationship. A unit or group of units such as illustrated although being equally adapted for home or domestic use are much more widely used in hotels, restaurants, hospitals, clubs and similar institutions of various kinds.

It is to be understood however that numerous of the advantageous and patentable features and instrumentalities of the present invention can be incorporated into and advantageously used in ovens other than of the portable type and in ovens other than those which are arranged in superposed relationship. The invention is limited only within the scope of the hereinafter appended claims.

Describing now that particular embodiment of the invention which I have selected for the purpose of illustrating and making the present invention understandable to those skilled in the art, it will be seen that there is a housing comprising an open angular frame 1 supporting outer side walls 2 and 3, an outer back wall 4, a top 5, and a front frame 6 within which is mounted a lower front closure panel 7 and an oven or chamber door 8 thereabove.

Figure 2:
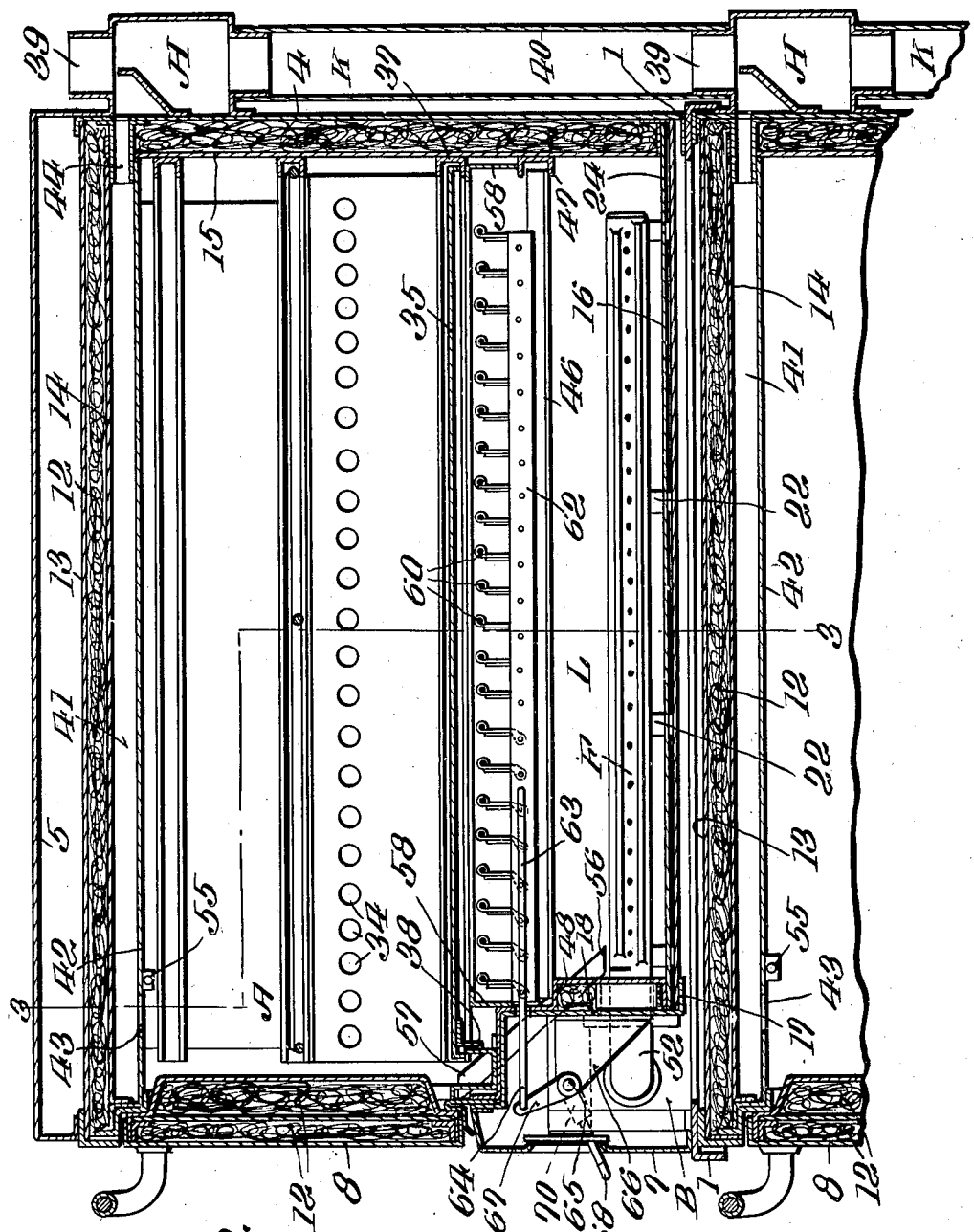
Fig. 2 is a vertical sectional view taken on the line 2—2 of Fig. 3 of the drawings.

When a single unit or oven is used it is provided with suitable legs 9. When units are arranged in superposed relationship as illustrated in Figs. 2 and 3 of the drawings the legs 9 I remove from all but the lowermost unit.

The cooking or roasting and baking oven or chamber is designated at A. The oven or cooking chamber is of the insulated type and to provide for this feature there are inner housing side walls 10 and 11 arranged in separated parallel relationship to the outer side walls 2 and 3 respectively and the space therebetween filled with suitable insulating material 12. When a single unit is used or the uppermost unit of a tier of units the hereinbefore referred to housing top 5 is utilized. Below this in spaced parallel relationship is a second housing top 13 which in all intermediate units constitutes the top proper of the unit as clearly appears in Figs. 2 and 3 of the drawings. The inner top of the housing is designated at 14 and is in spaced relationship to the top or plate 13 to provide a space which is filled with insulating material 12. At the back of the range there is an inner back plate 15 in spaced relationship to the outer back wall 4 of the housing to provide a space filled with insulating material 12.

The bottoms of the units are constructed in a particular and specific manner for a purpose which will hereinafter more fully appear. The bottom comprises a plate having under the center portion of the oven chamber a flat portion or area 16 which extends from the rear wall of the oven chamber forwardly to a point in separated relationship to the front closure panel of the range and has its front end suitably secured and supported upon the horizontally disposed leg 17 of a secondary front plate 18 between which and the said front panel 7 there is a burner manifold chamber B which extends transverse the front of the housing. At either side of its flat portion 16 the oven bottom outer wall is inclined upwardly as at 19 and is suitably secured as at 20 to the outer side walls 2 and 3 of the housing. This inclination is from side to side of the housing, that is to say, transverse the housing as respects the front and rear thereof, and the disposition of the chamber bottom is such as to provide oppositely positioned secondary air inlet chambers C and D which are interconnected by a narrow intermediate secondary air passageway E, all of which will be disposed above the top 13 (see Fig. 3 of the drawings) of an adjacent and subjacent oven unit when the housings are arranged in stacked or superposed relationship.

Central of the flat portion or area 16 the housing bottom is provided with two parallel rows of secondary air inlet openings 21 which are disposed between and below a pair of horizontally disposed burner arms F and G which are arranged in separated parallel and preferably back to back relationship and extend in a direction from front to back of the chamber and are supported in spaced relationship above the chamber bottom upon suitable brackets 22.

In perfecting the complete insulation of the chamber the chamber bottom is of double wall construction and has interior bottom plates 23 and 24 arranged in spaced relationship to the outer oven bottom and the intermediate space is filled with suitable insulating material 12. The inner ends of these bottom plates 23 and 24 terminate short of the secondary air inlet openings 21 so as to form no obstruction to the free passage of air therethrough.

Each of the burner arms in their outer walls, that is, their remote vertical walls, is provided with a plurality of aligned burner orifices 25 which are preferably though not necessarily drilled or disposed in a horizontal plane.

The oven chamber A within the housing is defined by the rear inner wall 15 of the main housing and has as a portion of its side walls a portion of the inner side walls 10 and 11 of the main housing. The remaining portion of the oven chamber side walls is in the form of vertically disposed plates 26 arranged in spaced relationship to the inner housing walls 10 and 11 to form flue passageways or chambers 27. These plates at their upper ends are secured to and supported by horizontally disposed plates 28 which form a top closure for the chambers 27 and which additionally carry angle irons 29 which provide a supporting slideway for the oven utensil rack 30. The lower ends of the plates 26 are secured to the top walls of a second set of angle iron guideways 31 which in turn are carried by plates 32 which form a bottom for the chambers 27. The bottom walls 32 of the chambers are provided with a plurality of aligned inlet passageways 33 while the chambers 27 communicate with the interior of the oven chamber at a point well above its bottom through a plurality of aligned inlet openings 34.

The oven bottom or hearth is illustrated as being made in two pieces designated at 35 and 36 respectively and is so constructed to facilitate its ready removal and replacement. As clearly appears in Fig. 3 of the drawings these hearth sections at their outer side edges are supported in the aforementioned channel irons or guideways 31 while their rear edges are supported in a suitable transversely extending channel iron 37 secured to the rear inner wall 15 of the housing. The front ends of these hearth or bottom sections are supported upon a transversely extending angle iron 38.

The hearth sections or oven bottom closes the oven chamber against communication with the lower portion of the housing or what might be well and properly termed the burner chamber of the housing except by way of passage through the openings 33, the chambers 27 and the openings 34 thereof into the oven.

Each housing or oven unit at its back is provided with an outlet flue box H provided with an upwardly extending collar 39 the upper end of which terminates at a point slightly above the housing plate top 13. The lower end of the flue box is provided with a downwardly extending conduit K, and by reference to Fig. 2 of the drawings it will be seen that when units are arranged in stacked or superposed relation the lower end 40 of the conduit or stack K telescopically receives the collar 39 of the flue box of the lower unit to provide a continuous outlet or stack flue at the rear of the housings.

Each oven chamber has above and extending completely over its top an outlet flue for heat and burned products of combustion which is designated at 41 and comprises the space between the innermost housing top 14 and a supplemental plate 42 provided with a plurality of openings 43 which provide communication between the oven chamber and said horizontally disposed flue 41. The flue 41 at its rear is in communication with the outlet flue box H as designated at 44.

In conformity with usual and accepted practice there is a second set of utensil rack supporting guideways 45 near the top of the oven chamber.

From the construction thus far described, and by reference particularly to Fig. 3 of the drawings it will be seen that there is within the main housing an oven chamber beneath the bottom of which is a burner chamber L the only direct communication between which chambers is had through the flues 27. This burner chamber L is provided with a top 46 the rear end of which is supported as at 47 upon the rear inner wall 15 of the housing while its front end is supported upon the top of a plate 48 which is disposed in spaced parallel relationship to the aforementioned secondary front plate 18. This burner chamber top 46 has its side walls or edges 49 terminating short of and in spaced relationship to the inner side walls 10 and 11 of the housing so as to provide free and open communication between the burner chamber and the inlet openings 33 into the flues or heat passageway chambers 27. These openings or passageways 50 at the side edges of the burner chamber top extend throughout the length of said top. The burner chamber cooking top 46 is arranged in separated parallel relationship to the oven bottom or hearth to provide a louvre chamber M.

Each housing unit at the lower end of its side or end walls 2 and 3 is provided with a plurality of secondary air inlet openings 51 into the secondary air chambers C and D which are disposed beneath the burner chamber bottom and the top 13 of a subjacent housing.

The burner arms F and G are suitably interconnected and fed by a common inlet pipe or manifold 52 which is concealed behind the front panel 7 within the manifold housing B. At the front of the panel 7 of the range a manually operable valve 53 is provided for controlling the delivery of gas to the burner arms. Additionally at the front of the range and convenient to the hand of the operator is a setting dial 54 of a thermostatic regulator for controlling the temperature within the over chamber A by means of controlling the delivery of gas to the burner arms. The heat regulator is not illustrated in detail nor will it be described inasmuch as it could be any one of well known types in common use in connection with gas heating and cooking appliances. The construction of these devices is well understood by those skilled in this art. The particular type of regulator here partially illustrated is that known as the liquid type and includes a liquid filled bulb 55 which is positioned adjacent the upper front end of the oven chamber.

For convenience in igniting the burner a lighter tube is provided the lower end 56 of which is adjacent the front end of the burner arms while its upper end 57 is positioned adjacent the door opening of the oven where a match or other igniting means can be conveniently applied.

Although a specific form of burner is illustrated and will be immediately hereinafter specifically described it is to be understood that this particular form of burner is recommended purely to the end of providing the highest degree of efficiency in the operation and accomplishment of the desired results, but that burners of other and different forms could be utilized and the invention still operate with a very high or varying degrees of success and efficiency.

As has been stated, the burner orifices or ports are in the form of horizontally disposed holes or gas passageways in the outer and remote faces of the vertical walls of the burner arms. This particular construction is recommended in that through it the heat of the flames burned at the burner ports will be applied more uniformly to the oven bottom both during the preheating and baking periods than would be the case were the orifices or pasageways inclined upwardly and outwardly so as to direct the flames towards the oven bottom. The horizontal disposition of the orifices makes it possible to reach a balanced oven temperature quickly and this is due to the fact that the hottest part of the flames burned at the burner are at a greater distance from the top of the combustion chamber and the further fact that the secondary air entering the inlet openings or ports 21 flows upwardly between the burner arms and over the tops thereof and this comparatively cool secondary air tempers the heat of the flames. The paths of travel of the secondary air around the burners as well as the paths of travel of the products of combustion after they leave the burner arms is indicated by arrows in Fig. 3 of the drawings.

The primary object of the invention being that of providing for convenient as well as almost instant control of the ratio of the top and bottom temperature within the oven chamber, discussion of this phase of the invention as well as a description of the remaining structural features which make this result obtainable, will now be given. To those skilled in this art as well as those familiar with the use of cooking devices, the desirability of a heat control of this kind will be obvious and known to be necessary to the most satisfactory accomplishment in the baking of cakes, pies, bread, rolls, cookies, etc.

In devices of the character of the present invention as now commonly known and in use the oven bottoms are heavily insulated and are massive or of great mass. Brick, tile, asbestos, wood, and many other substances and arrangements have been utilized in providing heavily insulated oven bottoms with the result that it has been necessary to preheat the oven to a temperature beyond that which is desired for accomplishment of baking and then, after the preheating has been accomplished, the thermostatic control or the manual gas valve has been set or operated to reduce the temperature within the oven to the desired degree. The result of this is that heat or additional heat is built or stored up in the oven bottom during the preheating period which in turn makes it practically impossible to obtain any bottom heat control whatsoever within the oven chamber. Furthermore this prior and long preheating period which is also necessary between "bakes" consumes time, and further and of great importance the heat holding capacity of the oven bottoms makes raising or lowering of the general oven temperature consume a much greater time than is the case with the present improved oven having a hearth or bottom which retains only a very small amount of heat. Prior ovens with heavy insulated bottoms due to the long preheating period through which they must pass also makes them more expensive to operate.

The flexibility of control provided by the present device is absolutely lacking in prior devices for the reasons above set forth.

As a consequence one of the features of the present invention is that of providing an oven bottom or hearth the mass of which is reduced to minimum which in itself makes it possible for heating up and cooling down of the oven temperatures to be accomplished in the shortest possible time, which eliminates a long preheating period and the objections present and above recited in respect to ovens having heavily insulated bottoms. In the present invention the oven bottom itself has no insulation and the insulation which is provided is in the form of adjustable louvres of special and specific construction, the nature of which will now be described.

For the purpose of facilitating manufacture and fabrication the louvres are illustrated as being made in two sets, but inasmuch as they are simultaneously operated it will be obvious that a single set could be provided and the same desirable results accomplished. Referring to Fig. 2 of the drawings it will be seen that there is a frame 58 and a frame 59 positioned in the louvre chamber M. These frames are of a size or define areas which are complementary to substantially the entire area of the oven bottom or hearth. A plurality of louvre plates P are pivotally mounted as at 60 in each of the frames and the width and mounting of these louvres is such that when they are moved into a horizontal position as illustrated in Fig. 1 of the drawings their longitudinal edges overlap so that the louvres form, when in this position, substantially a solid plate underlying the entire oven bottom and serving as an insulating medium thereof in respect to the burner arms and the heat generated thereby.

Each of the louvre plates intermediate its length is provided with a downwardly extending finger 61 which, in respect to each set of louvres, are in alignment and are pivotally connected to an elongated actuator rod or iron 62. Each of these rods or irons in turn carries a forwardly projecting link arm 63 the forward or outer ends 64 of which pass into and terminate within the manifold chamber B at the lower front of the housing. An operating shaft 65 extends longitudinally of the manifold housing B and is rotatably supported in suitable bracket bearings 66 which shaft is operatively connected to the outer ends 64 (see Fig. 6 of the drawings) of the link arms 63 by levers 67 which are secured to and oscillated by and with the shaft 65. This provides for simultaneous similar operation and setting of the louvres of both sets.

Oscillation of the shaft 65 is accomplished by an operating or setting handle 68 which extends through and is positioned at the front of the housing panel 7 while its inner end 69 is suitably secured, as by threads, within a block 70 which is secured to and has operating connection with the shaft 65 through the medium of a pin 71. By reference to Fig. 7 of the drawings it will be seen that the block 70 has a tapered passageway 72 for the passage of the shaft 65 with the result that the block 70 can move in a horizontal plane or from left to right as viewed in Figs. 1 and 6 of the drawings. A coil spring 73, the tension of which is adjustable through the medium of a screw 74, tends normally to hold the block and the handle 68 towards the left as viewed in Fig. 6 of the drawings with the result that the setting handle 8 will be held in engagement with any one of the notches 75 provided at the left side of a vertical slot 76 provided in a dial plate 77 within the slot of which said operating handle 68 is movable. This dial plate 77 carries suitable indicia to visually indicate the settings of the louvres.

In carrying out the high degree of successful top and bottom heat control within the oven chamber the louvres themselves have a particular characteristic which enables them, notwithstanding the fact that they are thin and have no appreciable mass, to act as a highly efficient insulating means for the oven bottom. This characteristic resides in making the louvres of polished aluminum. The shiny surfaces of these polished surfaces causes them to deflect or repel the radiated heat which constitutes the major portion of the heat which is transmitted through the burner chamber top 46 and the oven chamber hearth into the oven chamber proper. These shiny louvres act as a very effective insulating medium and the degree in which they act as an insulating means or medium to the transmission of heat through the oven bottom will be determined upon their setting. When the louvres are closed or partly closed it will therefore follow that the bottom temperature of the oven will be increased or decreased.

I have found it very desirable to make the louvres of polished aluminum as this metal does not discolor with heat and it has the quality of high heat conductivity which has a tempering affect on the heat from the flames of the burner. This conductivity will be towards the sides of the oven bottom and is desirable when the burner is first ignited, that is, when the oven is to be heated from a cold start. It will be evident that that portion of the combustion or burner chamber top immediately above the flames will be heated to the highest temperature which will in turn heat those louvres directly thereabove to a temperature higher than the louvres at either side of this area. The high conductivity of the aluminum louvres will cause them when in a closed and overlapping contacting relationship to cause the heat from the high temperature area to run or be conducted to the cooler louvres at the under sides of the side areas of the oven chamber and this will result to "even up" the temperature within the oven chamber much more rapidly than would be the case were the louvres constructed of a material having a low degree of heat conductivity.

It is to be understood however that the invention is not to be limited to louvres constructed of highly polished aluminum as other metals or materials having a polished or shiny surface would have to greater or lesser degrees the reflective qualities which are so important to the most efficient accomplishment of the control of the bottom temperature of the oven chamber.

The provision of the combustion or burner chamber top 46 is desirable and of importance in that it protects the louvres from discoloration from the products of combustion generated by the burner and particularly so in the event the burner should be out of adjustment. A badly adjusted burner would, without the burner chamber top, cause soot to be deposited upon the louvres. Additionally the burner chamber top protects the louvres from the direct heat of the flames burned at the burner which if permitted to strike the louvres would unquestionably greatly shorten their lives. The provision of the sheet metal burner chamber top will also act to slow the transfer of heat from the burner to any articles placed upon the oven hearth and prevent them from baking too dark, which could occur even were the louvres completely closed.

Referring now to Figs. 4 and 5 it will be seen that each of the hearth sections constituting the bottom of the oven are provided with upwardly extending projections 81. There are a plurality of lines or rows of these projections 81. On baking pans as usually manufactured and used one or more high spots are usually found in their bottoms and these high spots will conduct more heat from the hearth to a localized portion of the baking pans and this is highly undesirable. By providing the aforedescribed projections on the hearth the undesirable results due to the projections on the baking pans or utensils, is overcome and the goods within the pans will be baked to an even brownness. The arrangement of the high spots on the hearth is such as to prevent tilting of the baking pans or cooking utensils and will not interfere in sliding the pans on the hearth when putting them into or removing them from the oven chamber. The construction further is such as not to provide corners or cracks for the lodgement of boil-over of food and the hearth can be easily and quickly cleaned by a wire brushing or the like.

From the foregoing description a detailed description of operation is unnecessary as it will be understood by those skilled in the art that bottom heat control within the oven is brought about by simply moving the louvre setting handle 68 and thereby adjusting the louvres in any one of several positions. The position of the handle 68 will visually indicate the setting of the louvres and the ratio of bottom heat to top heat within the oven will be instantly changed, and this will be true even though there is an independent thermostatic temperature control for the oven chamber. The ratio of bottom to top heat will remain substantially the same independent of the setting of the main oven thermostatic control. Should the thermostat cut down the burner flame the convected heat to the upper area of the oven chamber and the radiated heat to the bottom of the oven chamber are reduced in the same proportion as both types of heat are supplied from the same source. The louvres, in accordance with their setting, control the rate of heat transfer through the oven bottom or hearth.

In operating the device from a cold start the louvres should be moved to a fully open position and when so set the oven chamber will heat in approximately one-third less time than when the louvres are in a closed position. This preheating will take place rapidly due to lack of mass in the oven bottom and will accordingly have the numerous advantages above and previously set forth.

To the end of further visually advising the operator of the temperature within the oven chamber and particularly the top area thereof, a thermometer 82 is provided on the front frame 6 of the housing.

I claim:

1. A cooking appliance comprising, a housing having therein a cooking chamber provided with a closed and comparatively thin bottom, a burner chamber beneath said cooking chamber bottom and having a burner therein, conduits constituting flueways which interconnect said burner chamber and the upper portion of said cooking chamber for constantly conveying from said burner chamber and delivering into the upper area only of said cooking chamber the heat and hot products of combustion generated by said burner, an outlet flue communicating with the upper area of said cooking chamber, and movable means positioned between said burner and said cooking chamber bottom for adjustably increasing or decreasing the heat transmitted by radiation to said cooking chamber from said burner through said cooking chamber bottom.

2. A cooking appliance comprising, a housing having therein a cooking chamber provided with a closed and comparatively thin bottom, a burner chamber beneath said cooking chamber bottom and having a burner therein, conduits constituting flueways which interconnect said burner chamber and the upper portion of said cooking chamber for constantly conveying from said burner chamber and delivering into the upper area only of said cooking chamber the heat and hot products of combustion generated by said burner, an outlet flue communicating with the upper area of said cooking chamber, a plurality of pivotally mounted louvres positioned between said burner and said cooking chamber bottom and substantially coextensive with said bottom when in a closed position, and means to adjust said louvres to increase or decrease their insulating effect in respect to said cooking chamber bottom to increase or decrease at will the amount of heat permitted to pass by radiation through said bottom into said bottom area of the cooking chamber.

3. A cooking appliance comprising, a housing having therein a cooking chamber provided with a closed and comparatively thin bottom, a burner chamber beneath said cooking chamber bottom and having a burner therein, conduits constituting flueways which interconnect said burner chamber and the upper portion of said cooking chamber for constantly conveying from said burner chamber and delivering into the upper area only of said cooking chamber the heat and hot products of combustion generated by said burner, an outlet flue communicating with the upper area of said cooking chamber, a plurality of horizontally disposed and pivotally mounted louvres positioned between said burner and said cooking chamber bottom and being substantially coextensive with said bottom when in a closed position, that side of the louvres facing said burner having a highly polished heat reflective surface, and means to rotate said louvres about their pivotal support to increase or decrease their angle of inclination to said cooking chamber bottom and said burner.

4. A cooking appliance comprising, a housing having therein a cooking chamber provided with a closed and comparatively thin bottom, a burner chamber beneath said cooking chamber bottom and having a burner therein, conduits constituting flueways which interconnect said burner chamber and the upper portion of said cooking chamber for constantly conveying from said burner chamber and delivering into the upper area only of said cooking chamber the heat and hot products of combustion generated by said burner, an outside flue communicating with the upper area of said cooking chamber, a horizontally disposed imperforate plate disposed in said burner chamber between the burner and the cooking chamber bottom and in spaced relationship to said bottom to provide a louvre receiving chamber, free communication at the sides of said louvre receiving chamber with said conduits, a plurality of pivotally mounted louvres positioned in said louvre receiving chamber and when in a closed position being disposed in a horizontal plane and being substantially coextensive with the bottom of said cooking chamber, and means to rotate said louvres about their pivotal support to increase or decrease their insulating effect in respect to said cooking chamber bottom to increase or decrease at will the amount of heat permitted to pass by radiation into said cooking chamber through the bottom thereof.

5. A construction such as defined in claim 4, wherein the under sides of said louvres are highly polished to present their polished and highly reflective surfaces to the burner and the heat generated thereby, and said imperforate horizontally disposed plate forming the bottom of said louvre receiving chamber and acting to prevent burning or discoloration of said louvres by the heat of and flames burned by said burner.

6. A cooking appliance comprising, a housing having therein a cooking chamber provided with a closed and comparatively thin bottom, a burner chamber beneath said cooking chamber bottom and having a burner therein, conduits constituting flueways which interconnect said burner chamber and the upper portion of said cooking chamber for constantly conveying from said burner chamber and delivering into the upper area only of said cooking chamber the heat and hot products of combustion generated by said burner, an outlet flue communicating with the upper area of said cooking chamber, a plurality of horizontally disposed and pivotally mounted louvres positioned between said burner and said cooking chamber bottom and adapted when in a closed position to be substantially coextensive with and cover said bottom to provide a heat insulating medium therefor, means external of said housing and operatively connected with said louvres for rotating them about their pivotal support, means to lock said louvre operating means to maintain said louvres in any one of a plurality of said positions, and means external of the housing and associated with said locking means for visually indicating the position at which said louvres are set.

7. A construction such as defined in claim 6, wherein the under side of said louvres are highly polished to present to said burner a highly effective heat reflective surface.

8. A cooking appliance comprising, a housing having therein a cooking chamber provided with a closed and comparatively thin bottom, a burner chamber beneath said cooking chamber bottom and having a burner therein, conduits constituting flueways which interconnect said burner chamber and the upper portion of said cooking chamber for constantly conveying from said burner chamber and delivering into the upper area only of said cooking chamber the heat and hot products of combustion generated by said burner, an outlet flue communicating with the upper area of said cooking chamber, a plurality of horizontally disposed and pivotally mounted louvres positioned between said burner chamber bottom and said burner and when in a closed position substantially covering said bottom, means to revolve said louvres about their pivotal support, said louvre operating means including a handle disposed externally of said housing and movable in a vertical plane to effect said louvre rotation, a plate having an opening in which said louvre operating handle is movable, one side of said opening provided with notches into which said louvre handle is normally urged under resilient tension whereby the handle can be locked in any one of a plurality of positions throughout its path of travel in a vertical plane, and indicia associated with said notches to visually indicate the position at which said louvres are set.

9. In a cooking appliance including an oven the combination providing top and bottom heat control comprising, a housing having therein an oven chamber provided with a closed and comparatively thin bottom and a burner chamber therebelow having a burner therein, said burner chamber having a top located in spaced relationship to said oven bottom, a conduit forming a passageway which interconnects said burner chamber and the upper portion of said cooking chamber for constantly delivering hot air and products of combustion generated by said burner into the upper area of said oven, thermal responsive means operative to automatically maintain a predetermined temperature in the upper area of said oven, means located between said burner chamber top and said oven bottom and adjustable to increase or reduce the amount of radiated heat transmitted through said cooking chamber bottom and into the bottom area of said oven, and means externally positioned in respect to said housing and manually operable to adjust said last named bottom heat control means, whereby the temperature in the top and bottom areas of said oven are jointly automatically and manually variably controlled.

10. In a cooking appliance including an oven the combination providing top and bottom oven heat control comprising, a housing having therein an oven provided with a closed and comparatively thin bottom, a burner chamber beneath said oven and having a burner therein, conduits constituting flueways interconnecting said burner chamber and said oven acting to constantly convey into the upper area only of said oven the heat and hot products of combustion generated by said burner, an outlet flue communicating with the upper area of said oven, a fuel supply for said burner, thermal responsive means located in the upper area of said oven and responsive to the temperature existing in said area and operative to automatically control the fuel supply to said burner for automatically maintaining in said area of said oven a predetermined temperature, means disposed between said oven bottom and said burner to provide an insulating medium which is adjustable to increase or reduce the amount of radiated heat transmitted through said oven bottom, and means external of said housing and manually operable to adjust said insulating means to effect a rapid change of ratio of temperature in the bottom area of the oven to that existing in the upper area thereof.

11. In a cooking appliance including an oven the combination providing top and bottom oven heat control comprising, a housing having therein an oven provided with a closed and comparatively thin bottom, a burner chamber beneath said oven and having a burner therein, conduits constituting flueways interconnecting said burner chamber and said oven acting to constantly convey into the upper area only of said oven the heat and hot products of combustion generated by said burner, an outlet flue communicating with the upper area of said oven, a fuel supply for said burner, thermal responsive means located in the upper area of said oven and responsive to the temperature existing in said area and operative to automatically control the fuel supply to said burner for automatically maintaining in said area of said oven a predetermined temperature, a plurality of horizontally disposed and pivotally mounted louvres positioned between said oven bottom and said burner and when in a closed position being substantially coextensive with and covering said oven bottom, said louvres constituting an adjustable insulating medium to increase or reduce the amount of radiated heat transmitted through said oven bottom and into the bottom area of said oven, and means external of said housing and manually operable to adjust said louvres.

12. A construction such as defined in claim 11, wherein the undersides of said louvres are highly polished to provide a highly efficient heat reflective surface which is presented to the heat generated by said burner.

13. A construction such as defined in claim 9, wherein the adjustable means for controlling the heat permitted to pass by radiation into said cooking chamber is provided with a highly polished surface which is presented to said burner and acts as a highly efficient heat reflective surface and said burner chamber top acting to prevent burning or discoloration of said polished surface by the heat and products of combustion generated by said burner.

14. In a range, a housing having an oven chamber therein, the bottom of said oven being imperforate and composed of a thin gage metal and being disposed in spaced relationship to said housing bottom to provide a burner chamber, a burner in said chamber, a conduit constituting a flueway at each side of said oven chamber having constant communication with the oven chamber at a point intermediate its height and considerably above the bottom of the chamber, said conduits also having constant communication with the burner chamber at the sides thereof, louvres disposed between the oven bottom and said burner and when in a closed position constituting a closed plate completely covering said oven bottom, a thin imperforate plate disposed between said burner and louvres and of a size to completely cover them, said oven bottom and said last named plate defining a chamber which at its sides communicate with the sides of said burner chamber, a thermo-responsive member disposed in the upper end of the oven and operatively connected to control the flow of fuel to said burner to automatically maintain a predetermined temperature in the oven chamber, and means conveniently positioned and manually operable to set said louvres at any position between full closed and fully open to control the heat delivery by radiation through said oven bottom into said oven chamber, the parts operating whereby temperature control in the bottom area of oven chamber can be obtained independent of the general temperature maintained in the oven by the thermo-responsive member.

EDWARD M. MEACHAM.